US012757280B2

(12) United States Patent
Lin et al.

(10) Patent No.: US 12,757,280 B2
(45) Date of Patent: Oct. 6, 2026

(54) COMMUNICATION METHOD AND COMMUNICATION APPARATUS

(71) Applicant: GUANGDONG OPPO MOBILE TELECOMMUNICATIONS CORP., LTD., Dongguan (CN)

(72) Inventors: Xue Lin, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 265 days.

(21) Appl. No.: 18/538,474

(22) Filed: Dec. 13, 2023

(65) Prior Publication Data

US 2024/0114584 A1 Apr. 4, 2024

Related U.S. Application Data

(63) Continuation of application No. PCT/CN2021/113065, filed on Aug. 17, 2021.

(51) Int. Cl.

| | |
|---|---|
| ***H04W 76/20*** | (2018.01) |
| ***H04B 17/318*** | (2015.01) |
| ***H04W 56/00*** | (2009.01) |
| ***H04W 72/12*** | (2023.01) |

(52) U.S. Cl.

CPC .......... *H04W 76/20* (2018.02); *H04B 17/328* (2023.05); *H04W 56/0015* (2013.01); *H04W 56/0045* (2013.01); *H04W 72/12* (2013.01)

(58) Field of Classification Search

CPC ............... H04W 72/23; H04W 56/001; H04W 74/0833; H04W 28/02; H04W 76/27; H04W 36/06

See application file for complete search history.

(56) References Cited

U.S. PATENT DOCUMENTS

| | | | | |
|---|---|---|---|---|
| 2021/0136646 | A1* | 5/2021 | Tseng | H04W 36/0088 |
| 2023/0022523 | A1* | 1/2023 | He | H04B 17/327 |
| 2024/0015834 | A1* | 1/2024 | You | H04W 76/20 |

FOREIGN PATENT DOCUMENTS

| | | |
|---|---|---|
| CN | 110139387 A | 8/2019 |
| WO | 2021136474 A1 | 7/2021 |

OTHER PUBLICATIONS

ZTE. 3GPP TSG-RAN WG1 Meeting #104-e R1-2102076, “Summary on the physical layer aspects of small data transmission”, Feb. 5, 2021 (Feb. 5, 2021), sections 1-3, 34 pages.

(Continued)

*Primary Examiner* — Iqbal Zaidi

(74) *Attorney, Agent, or Firm* — BAYES PLLC

(57) ABSTRACT

Provided are a communication method and a communication apparatus. The method includes: performing, by a terminal device, first Small Data Transmission (SDT) on a pre-Configured Grant (CG) resource corresponding to a first Synchronization Signal Black (SSB), wherein the terminal device is in an inactive state; and performing, by the terminal device, second SDT on the CG resource corresponding to the first SSB. According to the method in the embodiments of the disclosure, SDT of a User Equipment (UE) in an inactive state can be implemented.

20 Claims, 8 Drawing Sheets

(56) References Cited

OTHER PUBLICATIONS

ZTE. 3GPP TSG-RAN WG1 Meeting #105-e R1-2106129, "Summary on the physical layer aspects of small data transmission", May 27, 2021(May 27, 2021), sections 1-4, 30 pages.
International Search Report in the international application No. PCT/CN2021/113065, mailed on May 17, 2022, 5 pages with English translation.
English translation of the Written Opinion of the International Search Authority in the international application No. PCT/CN2021/113065, mailed on May 17, 2022, 8 pages with English translation.
ZTE Corporation, "Work Item on NR smalldata transmissions in INACTIVE state" 3GPP TSG RAN Meeting #91e RP-210870, eMeeting, Mar. 2021, the whole document, 5 pages.
Session Chair (InterDigital), "Report for Rel-17 Small data and URLLC/IIoT", 3GPP TSG-RAN WG2 Meeting #114 electronic R2-2106474, Online, May 2021, p. 12, 13 pages.
Huawei et al: "Small data transmission with CG-based scheme", 3GPP Draft; R2-2107492, 3rd Generation Partnership Project (3GPP), Mobile Competence Centre; 650, Route Des Lucioles; F-06921 Sophia-Antipolis Cedex; France vol. RAN WG2, No. Electronic Meeting; Aug. 9, 2021-Aug. 27, 2021, Aug. 6, 2021 (Aug. 6, 2021), XP052034164,p. 1, paragraph 1, p. 2, paragraph 2.2.1-p. 3, p. 8, paragraph 2.4, 10 pages.
ZTE et al: "The issues on user plane common aspects for SDT", 3GPP Draft; R2-2107487, 3rd Generation Partnership Project (3GPP), Mobilecompetence Centre ; 650, Routedes Lucioles; F-06921 Sophia-Antipolis Cedex; France vol. RAN WG2, No. eMeeting; Aug. 16, 2021-Aug. 27, 2021, Aug. 5, 2021 (Aug. 5, 2021), XP052032323, p. 7, line 1-line 14, 12 pages.
Supplementary European Search Report in the European application No. 21953688.5, mailed on Apr. 15, 2024, 9 pages.
First Office Action of the European application No. 21953688.5, issued on Nov. 27, 2024, 7 pages.
Supplementary European Search Report in the European application No. 26151724.7, mailed on Apr. 20, 2026.

* cited by examiner

COMMUNICATION METHOD AND COMMUNICATION APPARATUS

CROSS-REFERENCE TO RELATED APPLICATION

This application is a continuation of International Patent Application No. PCT/CN2021/113065 filed on Aug. 17, 2021, the entire contents of which are incorporated herein by reference.

TECHNICAL FIELD

The disclosure relates to the technical field of communications, and more specifically, to a communication method and a communication apparatus.

BACKGROUND

With the development of a communication technology, Small Data Transmission (SDT) under a Radio Resource Control (RRC) inactive (RRC_INACTIVE) state is introduced into some communication systems, so as to reduce unnecessary power consumption and signalling overhead.

SUMMARY

The disclosure provides a communication method and a communication apparatus, which can realize SDT of a User Equipment (UE) in an inactive state.

According to a first aspect, a communication method is provided, which includes that: a terminal device performs first SDT on a Configured Grant (CG) resource corresponding to a first Synchronization Signal Black (SSB). the terminal device being in an inactive state; and the terminal device performs second SDT on the CG resource corresponding to the first SSB.

According to a second aspect, a communication method is provided, which includes that: a terminal device performs first SDT on a CG resource corresponding to a first SSB, the terminal device being in an inactive state; the terminal device determines a first resource according to a second condition; and the terminal device performs second SDT on the first resource.

According to a third aspect, a communication method is provided, which includes that: a network device receives first SDT on a CG resource corresponding to a first SSB from a terminal device which is in an inactive state, and the network device receives second SDT from the terminal device on the CG resource corresponding to the first SSB.

According to a fourth aspect, a communication method is provided, which includes that: a network device receives first SDT on a CG resource corresponding to a first SSB from a terminal device which is in an inactive state, and the network device receives second SDT from the terminal device on a first resource, the first resource being determined according to a second condition.

According to a fifth aspect, a communication apparatus is provided, which includes a sending unit, configured to perform first SDT on a CG resource corresponding to a first SSB, the apparatus being in an inactive state. The sending unit is configured to perform second SDT on the CG resource corresponding to the first SSB.

According to a sixth aspect, a communication apparatus is provided, which includes: a sending unit, configured to perform first SDT on a CG resource corresponding to a first SSB, the apparatus being in an inactive state; and a determination unit, configured to determine a first resource according to a second condition. The sending unit is configured to perform second SDT on the first resource.

According to a seventh aspect, a communication apparatus is provided, which includes: a receiving unit, configured to receive first SDT on a CG resource corresponding to a first SSB from a terminal device which is in an inactive state. The receiving unit is configured to receive second SDT from the terminal device on the CG resource corresponding to the first SSB.

According to an eighth aspect, a communication apparatus is provided, which includes: a receiving unit, configured to receive first SDT on a CG resource corresponding to a first SSB from a terminal device which is in an inactive state. The receiving unit is configured to receive second SDT on a first resource from the terminal device, the first resource being determined according to a second condition.

According to a ninth aspect, a communication apparatus is provided, which includes a memory and a processor. The memory is configured to store a program, and the processor is configured to call the program stored in the memory, so as to execute the method described in any one of the first aspect, the second aspect, the third aspect, or the fourth aspect.

According to a tenth aspect, a communication apparatus is provided, which includes a processor, which is configured to call a program from a memory, so as to execute the method described in any one of the first aspect, the second aspect, the third aspect, or the fourth aspect.

According to an eleventh aspect, a chip is provided, which includes a processor configured to call a program from a memory, so as to enable a device provided with the chip to execute the method described in any one of the first aspect, the second aspect, the third aspect, or the fourth aspect.

According to a twelfth aspect, a computer-readable storage medium is provided, which stores a program. The program enables a computer to execute the method described in any one of the first aspect, the second aspect, the third aspect, or the fourth aspect.

According to a thirteenth aspect, a computer program product is provided, which includes a program. The program enables a computer to execute the method described in any one of the first aspect, the second aspect, the third aspect, or the fourth aspect.

According to a fourteenth aspect, a computer program is provided. The computer program enables a computer to execute the method described in any one of the first aspect, the second aspect, the third aspect, or the fourth aspect.

In the embodiments of the disclosure, SDT of a UE in an inactive state can be implemented, and the UE in the inactive state may perform the SDT without restoring connection, such that power consumption and signalling overhead can be reduced. In addition, a CG resource of a first SSB may be directly used during the second SDT, without determining the validity of the CG resource, thereby further reduce power consumption and signalling overhead.

DETAILED DESCRIPTION

The technical solutions in the disclosure are described below with reference to the drawings.

Figure 1:
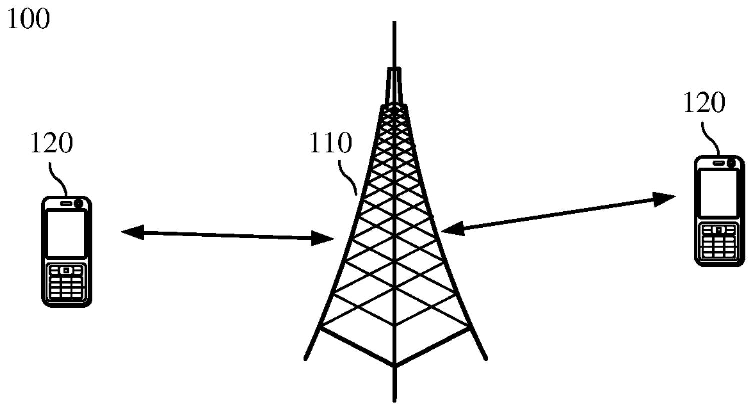
FIG. 1 is a schematic diagram of a wireless communication system according to an embodiment of the disclosure.

FIG. 1 shows a wireless communication system 100 according to an embodiment of the disclosure. The wireless communication system 100 may include a network device 110 and a User Equipment (UE) 120. The network device 110 may communicate with the UE 120. The network device 110 may provide communication coverage for a specific geographical region, and may communicate with the UE 120 located in the coverage region. The UE 120 may access a network (such as a wireless network) through the network device 110.

The wireless communication system 100 in FIG. 1 exemplarily shows a network device and two UEs. Optionally, the wireless communication system 100 may include a plurality of network devices, and the coverage of each network device may include other number of UEs. This embodiment of the disclosure is not limited thereto. Optionally, the wireless communication system 100 may further include other network entities such as a network controller and a mobile management entity. This embodiment of the disclosure is not limited thereto.

It is to be understood that, the technical solution of this embodiment of the disclosure is applicable to various communication systems, such as a 5th Generation (5G) system or New Radio (NR), a Long Term Evolution (LTE) system, an LTE Frequency Division Duplex (FDD) system, an LTE Time Division Duplex (TDD) system, etc. The technical solution provided in the disclosure is also applicable to a future communication system, such as a 6G mobile communication system and a satellite communication system.

The UE in this embodiment of the disclosure may also be called a terminal device, an access terminal, a user unit, a user station, a mobile station, a Mobile Station (MS), a Mobile Terminal (MT), a remote station, a remote terminal, a mobile device, a user terminal, a terminal, a wireless communication device, a user agent, or a user apparatus. The UE in this embodiment of the disclosure may refer to a device that provides speech and/or data connectivity to a user, and may be configured to be connected to a person, an object, and a machine, for example, a handheld device or a vehicle device having a wireless connection function. The UE in this embodiment of the disclosure may be a mobile phone, a Pad, a notebook computer, a personal digital assistant, a Mobile Internet Device (MID), a wearable device, a Virtual Reality (VR) device, an Augmented Reality (AR) device, a wireless terminal in industrial control, a wireless terminal in self driving, a wireless terminal in remote medical surgery, a wireless terminal in smart grid, a wireless terminal in transportation safety, a wireless terminal in smart city, or a wireless terminal in smart home. Optionally, the UE may be used to act as a base station. For example, the UE may act as a scheduling entity, which provides a side link signal between UEs in V2X or D2D. For example, a cellular telephone communicates with an automobile by using the side link signal. The cellular telephone communicates with a smart home device without using a base station relay communication signal.

The network device in this embodiment of the disclosure may be a device that is configured to communicate with the UE. The network device may also be called an access network device or a Radio Access Network (RAN) device. For example, the network device may be a base station. The network device in this embodiment of the disclosure may refer to an RAN node (or device) that accesses the UE to a wireless network. The base station may be generalized to cover various names in the following, or substituted with the following names, for example, a node B (NodeB), an evolved NodeB (eNB), a next generation NodeB (gNB), a relay station, an access point, a Transmitting and Receiving Point (TRP), a Transmitting Point (TP), a master MeNB, a slave SeNB, a Multi-System Radio (MSR) node, a home base station, a network controller, an access node, a wireless node, an Access Point (AP), a transmission node, a receiving and sending node, a Base Band Unit (BBU), a Remote Radio Unit (RRU), an Active Antenna Unit (AAU), a Remote Radio Head (RRH), a Central Unit (CU), a Distributed Unit (DU), a positioning node, and the like. The base station may be a macro base station, a micro base station, a relay node, a donor node, or the like, or a combination thereof.

In some embodiments, the network device may be fixed or mobile. For example, a helicopter or an unmanned aerial vehicle may be configured to act as a mobile network device; and one or more cells may move according to the position of the mobile network device. In other examples, the helicopter or the unmanned aerial vehicle may be configured to be used as a device communicating with another network device. In some embodiments, the network device may refer to a CU or a DU; or the network device may include the CU and the DU; or the network device may further include an AAU.

It is to be understood that, the network device may be deployed on the land, including indoors or outdoors, handheld or vehicle-mounted, or may also be deployed on the water, or may also be deployed on an airborne aircraft, balloon, and satellite. In this embodiment of the disclosure, the network device and a scenario where the network device is located in this embodiment of the disclosure are not limited. It is to also be understood that, all or part of functions of the network device and the UE in the disclosure may also be implemented through a software function running on hardware, or implemented through an instantiated virtualization function on a platform (such as a cloud platform).

In a 5G NR system, RRC states of UEs may be classified into 3 types, which respectively are an RRC idle state (RRC_IDLE), an RRC inactive state (RRC_INACTIVE), and an RRC connected state (RRC_CONNECTED). The RRC_INACTIVE state is a new state introduced by a 5G system from an energy-saving perspective. For a UE in the RRC_INACTIVE state, a radio bearer and all radio resources are released. However, the UE and a network device (for example, a base station) may reserve context information for UE access, so as to cause the UE to rapidly recover an RRC connection. A network generally maintains a UE with infrequent data transmission in the RRC_INACTIVE state.

In related art, a UE in the RRC_INACTIVE state does not support data transmission. When Mobile Originate (MO) or Mobile Terminate (MT) data arrives, the UE needs to perform data transmission by first recovering a connection, and then switches to an INACTIVE state after data transmission. For the UE with a small transmission data volume and a low transmission frequency, unnecessary power consumption and signalling overhead are caused by such a transmission mechanism.

An idea regarding SDT of a UE in a RRC_INACTIVE state has been proposed, but how the UE in the RRC_INACTIVE state performs the SDT and performs resource management during the SDT has not been determined yet.

In order to solve one or more of the above problems, the embodiments of the disclosure are described in detail below with examples with reference to FIG. 2.

Figure 2:
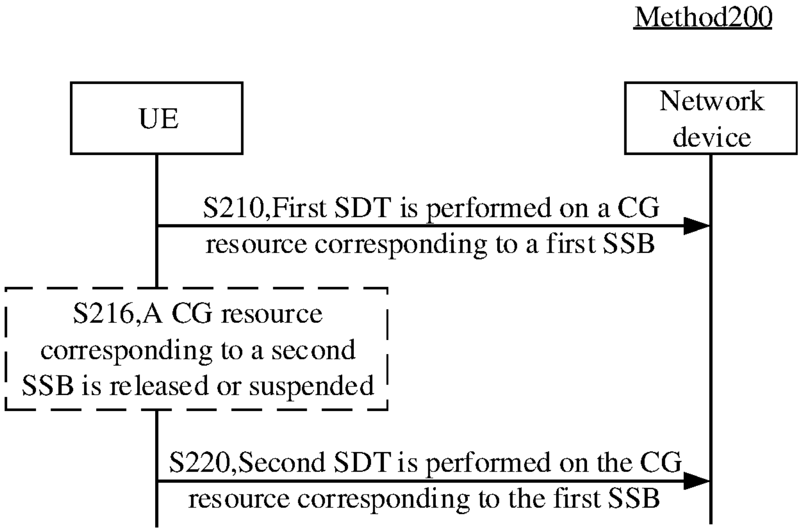
FIG. 2 is a schematic flowchart of a communication method according to an embodiment of the disclosure.

FIG. 2 is a schematic flowchart of a communication method according to an embodiment of the disclosure. It is to be understood that, FIG. 2 shows steps or operations of the communication method, but these steps or operations are merely examples. In this embodiment of the disclosure, other operations or the deformation of each operation in FIG. 2 may also be implemented, or not all steps need to be implemented, or these steps may be executed in a different order. The method 200 shown in FIG. 2 may include steps S210 and S220, which are shown below.

At S210, a UE performs first SDT to a network device on a CG resource corresponding to a first SSB.

The UE may be in an inactive state. For example, the UE may be in an RRC_INACTIVE state in a 5G NR system. Optionally, the first SDT may be SDT performed for the first time by the UE.

The CG resource corresponding to the first SSB may be configured by the network device. For example, the first SSB may be one of a plurality of SSBs. The plurality of SSBs may form an SSB burst set, and the network device may configure corresponding CG resource(s) for one or more SSBs in the SSB burst set.

At S220, the UE performs second SDT to the network device on the CG resource corresponding to the first SSB.

Optionally, the first SDT and the second SDT may belong to the same SDT process. For example, the second SDT may refer to SDT that is temporally after the first SDT.

In some embodiments, before S210, the UE may also determine whether a first condition is met. Optionally, when the first condition is met, the UE may perform the first SDT on the CG resource corresponding to the first SSB.

The first condition may include at least one of the followings:

Data to be transmitted in the first SDT belonging to a radio bearer that allows triggering of SDT, and a data volume of the data to be transmitted being not greater than a first threshold; a measurement result of Reference Signal Receiving Power (RSRP) of a cell where the terminal device is located being not less than a second threshold; there being a CG resource allocation for a carrier selected by the terminal device, and there being a CG resource corresponding to the first SSB; or Timing Advance (TA) corresponding to the terminal device being valid.

The radio bearer that allows the triggering of the SDT may be configured by the network device. The TA being valid may mean that a timer for the TA is in a running state, and/or RSRP variation (or RSRP variation of a beam selected by the UE) of a cell where the UE is located meets a third threshold. The first threshold, the second threshold, and the third threshold may be configured by the network device.

It is to be noted that, when arriving at an Access Stratum (AS), the data to be transmitted may be mapped onto different radio bearers according to a Quality of Service (QoS) requirement, and the SDT is a mechanism that the UE performs data transmission in the inactive state, such that not all the data to be transmitted on the radio bearer may perform the SDT. Therefore, when the data to be transmitted arrives, the UE first needs to determine whether the data to be transmitted is from the radio bearer that allows the triggering of the SDT (or allows performing of the SDT). Whether the radio bearer allows the triggering of the SDT may be configured by the network device.

In some embodiments, the method 200 may further include S216, which is shown below.

At S216, the UE releases or suspends a CG resource corresponding to the second SSB.

The second SSB may be an SSB in the plurality of SSBs other than the first SSB, and there may be at least one CG resource corresponding to the second SSB. The second SSB may include one or more SSBs. Optionally, the CG resource (s) corresponding to the second SSB may be configured by the network device.

Suspending here may be understood that, the UE saves CG resource allocation, but before an indication of the network device is received, the UE may not use a resource corresponding to the CG resource allocation to perform data transmission.

Optionally, in S216, the UE may release or suspend part or all of the at least one CG resource corresponding to the second SSB.

For example, an SSB burst set may include 4 SSBs, which respectively are SSB1, SSB2, SSB3, and SSB4. The network device may configure corresponding CG resources for the SSB1, the SSB2, and the SSB3, respectively. The SSB1 may be an SSB (which is the first SSB) currently selected by the UE, and the SSB2 and the SSB3 may be SSBs (which are the second SSBs) in the SSB burst set other than the SSB1, which have corresponding CG resources. In S216, the UE may release or suspend the CG resources corresponding to the SSB2 and the SSB3; or the UE may also release or suspend the CG resource corresponding to the SSB2; or the UE may also release or suspend the CG resource corresponding to the SSB3; or the UE may also release or suspend part of CG resources (or all the CG resources) corresponding to the SSB2 and/or part of CG resources (or all the CG resources) corresponding to the SSB3.

In this embodiment of the disclosure, the UE performs the second SDT by using the CG resource corresponding to the first SSB, without using the CG resource(s) corresponding to the second SSB. In this case, releasing or suspending the CG resource(s) corresponding to the second SSB may improve the utilization rate of a communication resource, such that the efficiency of a communication system can be improved.

In this embodiment of the disclosure, the timing for implementing S216 is not limited.

In some embodiments, after initiating the SDT, the UE may release or suspend the CG resource(s) corresponding to the second SSB.

For example, the UE may release or suspend the CG resource(s) corresponding to the second SSB when the first condition is met; or the UE may also release or suspend the CG resource(s) corresponding to the second SSB before performing the first SDT; or the UE may also release or suspend the CG resource(s) corresponding to the second SSB during the first SDT.

In some embodiments, the UE may release or suspend the CG resource(s) corresponding to the second SSB after completing the first SDT.

For example, the UE may release or suspend the CG resource(s) corresponding to the second SSB after performing the first SDT.

In some embodiments, the UE may release or suspend the CG resource(s) corresponding to the second SSB when completing the first SDT and receiving a feedback from the network device.

For example, after successfully receiving data sent through the first SDT, the network device may send feedback information to the UE; and accordingly, the UE may release or suspend the CG resource(s) corresponding to the second SSB after receiving the feedback information.

The feedback information may be feedback information for the first SDT. For example, the feedback information may be reception acknowledgement information (for example, L1-ACK information), retransmission scheduling information, or new-transmission scheduling information. The feedback information may also be other types of feedback information, and the embodiments of the disclosure are not limited thereto.

In some embodiments, the UE may release or suspend, on the basis of the indication of the network device, the CG resource(s) corresponding to the second SSB.

For example, the network device may send indication information to the UE; and accordingly, after receiving the indication information, the UE may release or suspend, according to the indication information, the CG resource(s) corresponding to the second SSB.

The indication information may be configured to indicate the releasing or suspending of the CG resource(s) corresponding to the second SSB.

Optionally, the indication information may be configured to indicate the releasing or suspending part or all of at least one CG resource corresponding to the second SSB.

In the embodiments of the disclosure, SDT of a UE in an inactive state can be implemented, and the UE in the inactive state may perform the SDT without restoring connection, such that power consumption and signalling overhead can be reduced. In addition, the CG resource for the first SSB may be directly used during the second SDT, without determining the validity of the CG resource, thereby further reduce power consumption and signalling overhead.

Figure 3:
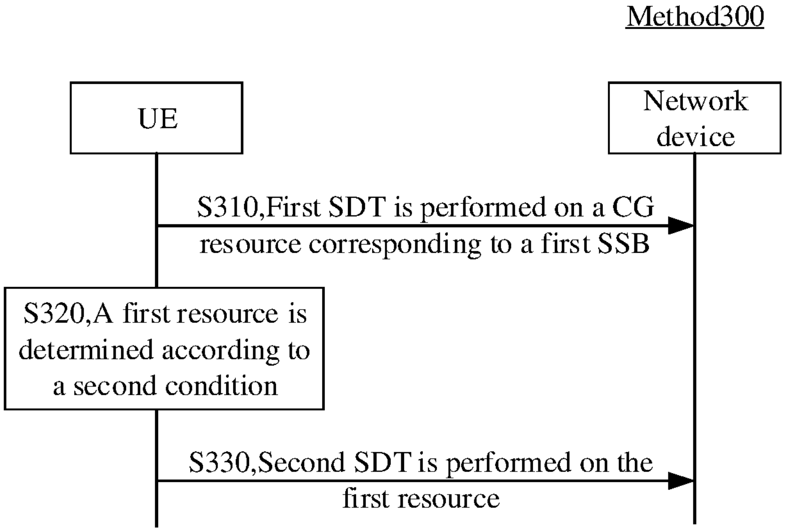
FIG. 3 is a schematic flowchart of a communication method according to another embodiment of the disclosure.

FIG. 3 is a schematic flowchart of a communication method according to an embodiment of the disclosure. It is to be understood that, FIG. 3 shows steps or operations of the communication method, but these steps or operations are merely examples. In this embodiment of the disclosure, other operations or the deformation of each operation in FIG. 3 may also be implemented, or not all steps need to be implemented, or these steps may be implemented in a different order. The method 300 shown in FIG. 3 may include steps S310, S320, and S330, which are shown below.

At S310, a UE performs first SDT on a CG resource corresponding to a first SSB.

The UE may be in an inactive state. For example, the UE may be in an RRC_INACTIVE state in a 5G NR system. Optionally, the first SDT may be SDT performed for the first time by the UE.

The CG resource corresponding to the first SSB may be configured by a network device. For example, the first SSB may be one of a plurality of SSBs. The plurality of SSBs may form an SSB burst set, and the network device may configure corresponding CG resource(s) for one or more SSBs in the SSB burst set.

At S320, the UE determines a first resource according to a second condition.

The second condition may include the following several implementations, which are shown below.

Implementation I:

For example, the second condition may include the following conditions:

(1) TA corresponding to the UE being valid.

(2) RSRP of the first SSB meeting a preset threshold.

(3) When the first SSB does not meet the preset threshold, RSRP of a second SSB meeting the preset threshold, and there being at least one CG resource corresponding to the second SSB.

The first SSB may be one of a plurality of SSBs. The second SSB may be an SSB in the plurality of SSBs other than the first SSB, and there may be at least one CG resource corresponding to the second SSB.

Implementation II:

For example, the second condition may include the following conditions:

(1) TA corresponding to the UE being valid.

(2) RSRP of a third SSB meeting the preset threshold, and there being a CG resource corresponding to the third SSB.

The first SSB may be one of the plurality of SSBs. The plurality of SSBs may include the third SSB. Optionally, the third SSB may be understood as any SSB in the plurality of SSBs that meets the condition (2).

Optionally, the at least one CG resource corresponding to at least one of the plurality of SSBs may be configured by the network device. For example, the CG resource corresponding to the first SSB, the CG resource(s) corresponding to the second SSB, and/or the CG resource corresponding to the third SSB may be configured by the network device.

At S330, the UE performs second SDT on the first resource.

Optionally, the first SDT and the second SDT may belong to the same SDT process. For example, the second SDT may refer to SDT that is temporally after the first SDT.

In some embodiments, before S310, the UE may also determine whether a first condition is met. Optionally, when the first condition is met, the UE may perform the first SDT on the CG resource corresponding to the first SSB.

The first condition may include at least one of the followings:

Data to be transmitted in the first SDT belonging to a radio bearer that allows triggering of SDT, and a data volume of the data to be transmitted being not greater than a first threshold; a measurement result of RSRP of a cell where the UE is located being not less than a second threshold; there being a CG resource allocation for a carrier selected by the UE, and there being a CG resource corresponding to the first SSB; or TA corresponding to the UE being valid.

In this embodiment of the disclosure, the UE determines the first resource according to the second condition, such that the validity of the first resource may be improved, and the efficiency of the second SDT is improved, thereby improving the efficiency of a communication system.

In this embodiment of the disclosure, in S320, the first resource may be determined by the following various ways.

In some embodiments, for the second condition in Implementation I, when the TA corresponding to the UE is valid and the RSRP of the first SSB meets the preset threshold, the first resource may be the CG resource corresponding to the first SSB. That is to say, when (1) and (2) of the second condition are met, the first resource may be the CG resource corresponding to the first SSB.

In some embodiments, for the second condition in Implementation I, when the TA corresponding to the UE is valid, the RSRP of the first SSB does not meet the preset threshold, but the RSRP of the second SSB meets the preset threshold, the first resource may be the CG resource(s) corresponding to the second SSB. That is to say, when (1) and (3) of the second condition are met, the first resource may be the CG resource(s) corresponding to the second SSB.

In some embodiments, for the second condition in Implementation II, when the TA corresponding to the UE is valid and the RSRP of the third SSB meets the preset threshold, the first resource may be the CG resource corresponding to the third SSB. That is to say, when (1) and (2) of the second condition are met, the first resource may be the CG resource corresponding to the third SSB.

In some embodiments, when the second condition is not met, the first resource may be the CG resource corresponding to the first SSB.

It is to be noted that, in this embodiment of the disclosure, not meeting the second condition may mean that, the TA corresponding to the UE is invalid, and/or there is no SSB in the plurality of SSBs that meets the condition (2) or (3) of the second condition in Implementation I; or the TA corresponding to the UE is invalid, and/or there is no SSB in the plurality of SSBs that meets the condition (2) of the second condition in Implementation II.

In some embodiments, when the second condition is not met, the UE may monitor dynamic scheduling of the network device to determine the first resource.

For example, when the second condition is not met, the UE may initiate a contention-based random access process, and in the random access process, the UE may send identity identifier information of the UE through a message Msg3 or a message MsgA; and when the network device indicates a contention collision resolution, the UE may monitor the first resource that is dynamically scheduled by the network device.

Optionally, the UE may release or suspend at least one CG resource corresponding to at least one of the plurality of SSBs. For example, the UE may release or suspend a CG resource corresponding to a SSB which has the corresponding CG resource among the plurality of SSBs. In this way, the utilization rate of a communication resource may be improved, such that the efficiency of a communication system can be improved.

Optionally, the UE may release or suspend the at least one CG resource corresponding to the at least one SSB when at least one of following conditions is met:

- a contention collision resolution message sent by the network device being received;
- after the contention collision resolution message is received, indication information that is sent by the network device and configured to release or suspend the at least one CG resource corresponding to the at least one SSB being received; and
- the second condition being not met.

In some embodiments, when the second condition is not met, the first resource may be the CG resource corresponding to the first SSB.

For example, when the second condition is not met, the UE may initiate a contention-based random access process, and in the random access process, the UE may send the identity identifier information of the UE through the message Msg3 or the message MsgA; and when the network device indicates a contention collision resolution, a CG resource for last SDT is used as the first resource.

For example, when the first SDT and the second SDT are two adjacent SDTs, the first SDT may be the last SDT prior to the second SDT. In this case, the first resource may be the CG resource corresponding to the first SSB.

In some embodiments, when the second condition is not met, the first resource may be pre-configured by the network device.

For example, when the second condition is not met, the UE may initiate a contention-based random access process, and in the random access process, the UE may send identity identifier information of the UE through Msg3 or MsgA; and when the network device indicates a contention collision resolution, a resource pre-configured by the network device is used as the first resource.

The first resource may be different from the CG resource (s) corresponding to at least one of the plurality of SSBs. It may be seen that, in this case, the first resource may be different from the CG resource corresponding to the first SSB, the CG resource(s) corresponding to the second SSB, or the CG resource corresponding to the third SSB.

In some embodiments, when the second condition is not met, the UE may receive second information sent by the network device. The second information may be configured to indicate the first resource.

In this case, the first resource may also be different from the CG resource(s) corresponding to at least one of the plurality of SSBs. Optionally, the first resource may be different from the CG resource corresponding to the first SSB, the CG resource(s) corresponding to the second SSB, or the CG resource corresponding to the third SSB.

For example, when the second condition is not met, the UE may initiate a contention-based random access process, and in the random access process, the UE may send identity identifier information of the UE through the message Msg3 or the message MsgA; and when the network device indicates a contention collision resolution, the terminal device may receive the second information from the network device.

Optionally, the second information may be carried in Downlink Control Information (DCI), Media Access Control Control Element (MAC CE) information, or Radio Resource Control (RRC) information.

In this embodiment of the disclosure, the UE may further send, to the network device, third information for indicating a fourth SSB when the plurality of SSBs include the fourth SSB that meets at least one of the followings:

- RSRP of the fourth SSB meeting the preset threshold, and there being a CG resource corresponding to the fourth SSB;
- the fourth SSB being an SSB with the best signal quality among the plurality of SSBs, and there being no CG resource corresponding to the fourth SSB; and
- the fourth SSB being the only SSB with RSRP meeting the preset threshold among the plurality of SSBs, and there being a CG resource corresponding to the fourth SSB.

Optionally, the UE may send the third information through an MAC CE on a CG resource corresponding to one of the plurality of SSBs. For example, the UE may send the third information on a CG resource corresponding to an SSB that currently has a valid CG resource among the plurality of SSBs.

Optionally, the third information may include an index of the fourth SSB in the plurality of SSBs; or the third information may include an index list of the plurality of SSBs, and the index list is configured according to signal quality of the plurality of SSBs from good to poor or from poor to good; or the third information may include indexes of the plurality of SSBs, and signal quality measurement results corresponding to the plurality of SSBs.

In some embodiments, when the second condition is not met, the UE may receive fourth information from the network device. Alternatively, when the second condition is not met, the network device may adjust a correspondence relationship between at least one of the plurality of SSBs and at least one CG resource. The fourth information may be configured to instruct the terminal device to release the at least one CG resource corresponding to at least one of the plurality of SSBs.

The method embodiments of the disclosure are described in detail above in combination with FIG. 1 to FIG. 3. The apparatus embodiments of the disclosure are described in detail below in combination with FIG. 4 to FIG. 8. It is to be understood that, descriptions of the method embodiments mutually correspond to descriptions of the apparatus embodiments, such that portions not described in detail may be found in the previous method embodiments.

Figure 4:
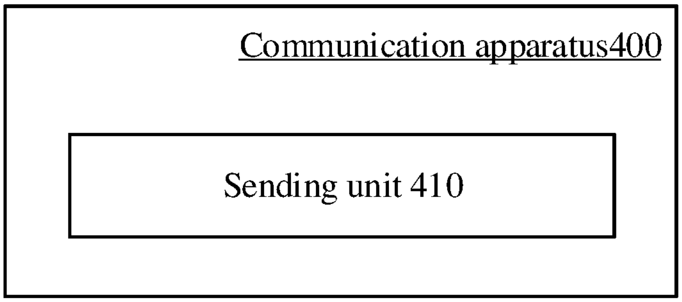
FIG. 4 is a schematic structural diagram of a communication apparatus according to an embodiment of the disclosure.

FIG. 4 is a schematic structural diagram of a communication apparatus according to an embodiment of the disclosure. The communication apparatus 400 in FIG. 4 includes a sending unit.

The sending unit 410 is configured to perform first SDT on a CG resource corresponding to a first SSB. The apparatus is in an inactive state.

The sending unit 410 is configured to perform second SDT on the CG resource corresponding to the first SSB.

Optionally, the first SSB is one of a plurality of SSBs. The apparatus may further include a processing unit 420, which is configured to release or suspend a CG resource corresponding to a second SSB. The second SSB is an SSB in the plurality of SSBs other than the first SSB, and there is at least one CG resource corresponding to the second SSB.

Optionally, the processing unit 420 is configured to, when a first condition is met, release or suspend the CG resource (s) corresponding to the second SSB.

Optionally, the processing unit 420 is configured to, after the apparatus performs the first SDT, release or suspend the CG resource(s) corresponding to the second SSB.

Optionally, the processing unit 420 is configured to receive first information from a network device, where the first information is feedback information of the first SDT, or the first information is configured to indicate the releasing or suspending of the CG resource(s) corresponding to the second SSB; and release or suspend the CG resource of the second SSB according to the first information.

Optionally, the feedback information may be reception acknowledgement information, retransmission scheduling information, or new-transmission scheduling information.

Optionally, the first information may be configured to indicate the releasing or suspending of part or all of the at least one CG resource corresponding to the second SSB.

Optionally, the CG resource corresponding to the first SSB and the CG resource(s) corresponding to the second SSB may be configured by the network device.

Optionally, the sending unit 410 is configured to, when the first condition is met, perform the first SDT on the CG resource corresponding to the first SSB.

Optionally, the first condition may include at least one of the followings: data to be transmitted in the first SDT belonging to a radio bearer that allows triggering of SDT, and a data volume of the data to be transmitted being not greater than a first threshold; a measurement result of RSRP of a cell where the apparatus is located being not less than a second threshold; there being a CG resource allocation for a carrier selected by the apparatus, and there being a CG resource corresponding to the first SSB; or TA corresponding to the apparatus being valid.

Figure 5:
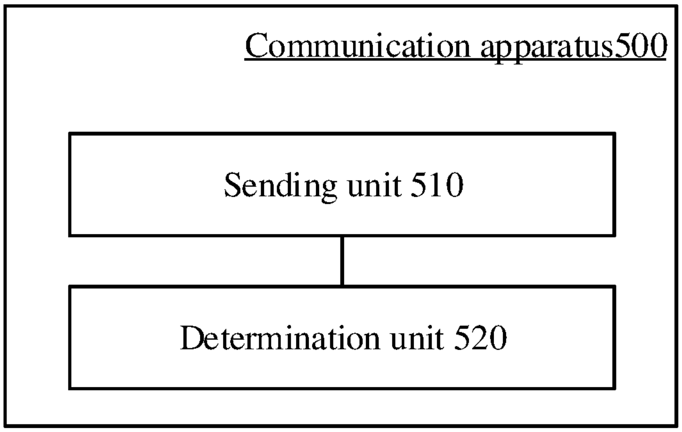
FIG. 5 is a schematic structural diagram of a communication apparatus according to another embodiment of the disclosure.

FIG. 5 is a schematic structural diagram of a communication apparatus according to another embodiment of the disclosure. The communication apparatus 500 in FIG. 5 includes a sending unit and a determination unit.

The sending unit 510 is configured to perform first SDT on a CG resource corresponding to a first SSB. A terminal device is in an inactive state.

The determination unit 520 is configured to determine a first resource according to a second condition.

The sending unit 510 is configured to perform second SDT on the first resource.

Optionally, the second condition may include: TA corresponding to the apparatus being valid, and RSRP of the first SSB meeting a preset threshold, or when the first SSB does not meet the preset threshold, RSRP of a second SSB meeting the preset threshold, and there being a CG resource corresponding to the second SSB, wherein the first SSB is one of a plurality of SSBs, and the second SSB is an SSB in the plurality of SSBs other than the first SSB.

Optionally, the second condition may include: TA corresponding to the apparatus being valid, and RSRP of a third SSB meeting the preset threshold; and there being a CG resource corresponding to the third SSB, wherein the first SSB is one of the plurality of SSBs, and the plurality of SSBs include the third SSB.

Optionally, the first resource may be the CG resource corresponding to the first SSB; and the TA corresponding to the apparatus may be valid, and the RSRP of the first SSB may meet the preset threshold.

Optionally, the first resource may be the CG resource(s) corresponding to the second SSB; and the TA corresponding to the apparatus may be valid, the RSRP of the first SSB may not meet the preset threshold, but the RSRP of the second SSB may meet the preset threshold.

Optionally, the first resource may be the CG resource corresponding to the third SSB; and the TA corresponding to the apparatus may be valid, and the RSRP of the third SSB may meet the preset threshold.

Optionally, when the second condition is not met, the first resource may be the CG resource corresponding to the first SSB.

Optionally, when the second condition is not met, the apparatus may further include a random access unit 530 and a monitoring unit 540. The random access unit 530 is configured to initiate a contention-based random access process. In the random access process, the apparatus may send identity identifier information of the apparatus through a message Msg3 or a message MsgA. The monitoring unit 540 is configured to monitor dynamic scheduling of a network device to determine the first resource.

Optionally, the apparatus may further include a processing unit 550, which is configured to release or suspend at least one CG resource corresponding to at least one of the plurality of SSBs.

Optionally, the processing unit 550 is configured to: release or suspend the at least one CG resource corresponding to the at least one SSB when at least one of following conditions is met: a contention collision resolution message sent by the network device being received; after the contention collision resolution message is received, indication information that is sent by the network device and configured to release or suspend the at least one CG resource corresponding to the at least one SSB being received; or the second condition being not met.

Optionally, when the second condition is not met, the apparatus may further include a random access unit 530, which is configured to initiate a contention-based random access process. In the random access process, the apparatus may send identity identifier information of the apparatus through a message Msg3 or a message MsgA. The sending unit 510 is configured to, after receiving a contention collision resolution message, perform the second SDT by using the first resource. The first resource may be a CG resource for last SDT.

Optionally, when the second condition is not met, the apparatus may further include a random access unit 530, which is configured to initiate a contention-based random access process. In the random access process, the apparatus may send identity identifier information of the apparatus through a message Msg3 or a message MsgA. The sending unit 510 is configured to, after receiving a contention collision resolution message, perform the second SDT by using the first resource. The first resource may be pre-configured by the network device.

Optionally, when the second condition is not met, the apparatus may further include a random access unit 530 and a receiving unit 560. The random access unit 530 is configured to initiate a contention-based random access process. In the random access process, the apparatus may send identity identifier information of the apparatus through a message Msg3 or a message MsgA. The receiving unit 560 is configured to receive second information. The second information is configured to indicate the first resource.

Optionally, the second information may be carried in DCI, MAC CE information, or RRC information.

Optionally, the first resource may be different from a CG resource corresponding to at least one of the plurality of SSBs.

Optionally, at least one CG resource corresponding to at least one of the plurality of SSBs may be configured by the network device.

Optionally, the sending unit 510 is further configured to send third information for indicating a fourth SSB when the plurality of SSBs include the fourth SSB that meets at least one of the followings: RSRP of the fourth SSB meeting the preset threshold and there being no CG resource corresponding to the fourth SSB; the fourth SSB being an SSB with the best signal quality among the plurality of SSBs, and there being no CG resource corresponding to the fourth SSB; or the fourth SSB being the only SSB with RSRP meeting the preset threshold among the plurality of SSBs, and there being a CG resource corresponding to the fourth SSB.

Optionally, the sending unit 510 is configured to send the third information through an MAC CE on a CG resource corresponding to one of the plurality of SSBs.

Optionally, the third information may include an index of the fourth SSB in the plurality of SSBs; or the third information may include an index list of the plurality of SSBs, and the index list is configured according to signal quality of the plurality of SSBs from good to poor or from poor to good; or the third information may include indexes of the plurality of SSBs, and signal quality measurement results corresponding to the plurality of SSBs.

Optionally, when the second condition is met, the apparatus may further include a receiving unit 560, which is configured to receive fourth information. The fourth information is configured to indicate the releasing of the at least one CG resource corresponding to at least one of the plurality of SSBs.

Figure 6:
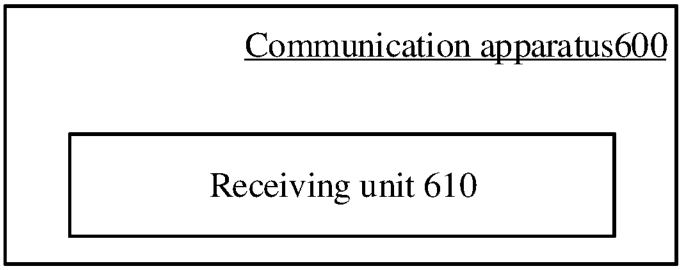
FIG. 6 is a schematic structural diagram of a communication apparatus according to still another embodiment of the disclosure.

FIG. 6 is a schematic structural diagram of a communication apparatus according to still another embodiment of the disclosure. The communication apparatus 600 in FIG. 6 includes a receiving unit.

The receiving unit 610 is configured to receive first SDT on a CG resource corresponding to a first SSB from a terminal device which is in an inactive state.

The receiving unit 610 is configured to receive second SDT on the CG resource corresponding to the first SSB from the terminal device.

Optionally, the first SSB may be one of a plurality of SSBs. The apparatus may further include a sending unit 620, which is configured to send first information. The first information may be feedback information of the first SDT, or the first information may be configured to indicate the releasing or suspending of a CG resource corresponding to a second SSB; and the second SSB may be an SSB in the plurality of SSBs other than the first SSB, and there may be at least one CG resource corresponding to the second SSB.

Optionally, the feedback information may be reception acknowledgement information, retransmission scheduling information, or new-transmission scheduling information.

Optionally, the first information may be configured to indicate the releasing or suspending of part or all of the at least one CG resource corresponding to the second SSB.

Optionally, the CG resource corresponding to the first SSB and the CG resource(s) corresponding to the second SSB may be e configured by the apparatus.

Figure 7:
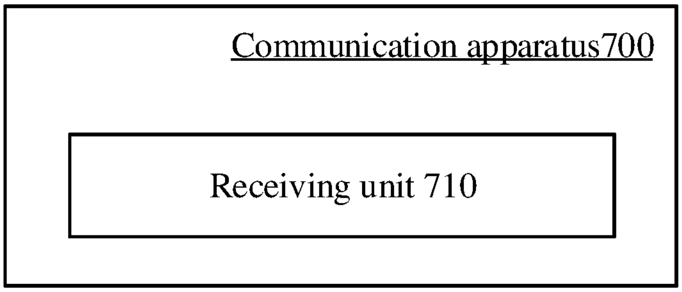
FIG. 7 is a schematic structural diagram of a communication apparatus according to still another embodiment of the disclosure.

FIG. 7 is a schematic structural diagram of a communication apparatus according to still another embodiment of the disclosure. The communication apparatus 700 in FIG. 7 includes a receiving unit.

The receiving unit 710 is configured to receive first SDT on a CG resource corresponding to a first SSB from a terminal device which is in an inactive state.

The receiving unit 710 is configured to receive second SDT on a first resource from the terminal device. The first resource is determined according to a second condition.

Optionally, the second condition may include: TA corresponding to the terminal device being valid, and RSRP of the first SSB meeting a preset threshold, or when the first SSB does not meet the preset threshold, RSRP of a second SSB meeting the preset threshold, and there being a CG resource corresponding to the second SSB, wherein the first SSB is one of a plurality of SSBs, and the second SSB is an SSB in the plurality of SSBs other than the first SSB.

Optionally, the second condition may include: TA corresponding to the terminal device being valid and RSRP of a third SSB meeting the preset threshold; and there being a CG resource corresponding to the third SSB. The first SSB may be one of the plurality of SSBs, and the plurality of SSBs may include the third SSB.

Optionally, the first resource may be the CG resource corresponding to the first SSB; and the TA corresponding to the terminal device may be valid, and the RSRP of the first SSB may meet the preset threshold.

Optionally, the first resource may be the CG resource(s) corresponding to the second SSB; and the TA corresponding to the terminal device may be valid, the RSRP of the first SSB may not meet the preset threshold, but the RSRP of the second SSB may meet the preset threshold.

Optionally, the first resource may be the CG resource corresponding to the third SSB; and the TA corresponding to the terminal device may be valid, and the RSRP of the third SSB may meet the preset threshold.

Optionally, when the second condition is not met, the first resource may be the CG resource corresponding to the first SSB.

Optionally, when the second condition is not met, the apparatus may further include a random access unit 720 and a dynamic scheduling unit 730. The random access unit 720 is configured to receive a contention-based random access process initiated by the terminal device. In the random access process, the apparatus may receive identity identifier information of the terminal device that is sent by the terminal device through a message Msg3 or a message MsgA. The dynamic scheduling unit 730 is configured to dynamically schedule the first resource for the terminal device.

Optionally, when the second condition is not met, the first resource may be a CG resource for last SDT.

Optionally, when the second condition is not met, the first resource may be pre-configured by the apparatus.

Optionally, when the second condition is not met, the apparatus may further include a random access unit 720 and a sending unit 740. The random access unit 720 is configured to receive a contention-based random access process initiated by the terminal device. In the random access process, the apparatus may receive identity identifier information of the terminal device that is sent by the terminal device through a message Msg3 or a message MsgA. The sending unit 740 is configured to send second information. The second information is configured to indicate the first resource.

Optionally, the second information may be carried in DCI, MAC CE information, or RRC information.

Optionally, the first resource may be different from a CG resource corresponding to at least one of the plurality of SSBs.

Optionally, at least one CG resource corresponding to at least one of the plurality of SSBs may be configured by the apparatus.

Optionally, the receiving unit 710 is further configured to receive third information for indicating a fourth SSB when the plurality of SSBs include the fourth SSB that meets at least one of the followings: RSRP of the fourth SSB meeting the preset threshold, and there being no CG resource corresponding to the fourth SSB; the fourth SSB being an SSB with the best signal quality among the plurality of SSBs, and there being no CG resource corresponding to the fourth SSB; or the fourth SSB being the only SSB with RSRP meeting the preset threshold among the plurality of SSBs, and there being a CG resource corresponding to the fourth SSB.

Optionally, the receiving unit 710 is configured to receive the third information through an MAC CE on a CG resource corresponding to one of the plurality of SSBs.

Optionally, the third information may include an index of the third SSB in the plurality of SSBs; or the third information may include an index list of the plurality of SSBs, and the index list is configured according to signal quality of the plurality of SSBs from good to poor or from poor to good; or the third information may include indexes of the plurality of SSBs, and signal quality measurement results corresponding to the plurality of SSBs.

Optionally, when the second condition is met, the apparatus may further include a sending unit 740 or an adjustment unit 750. The sending unit 740 is configured to send fourth information. The fourth information is configured to indicate the releasing of the at least one CG resource corresponding to at least one of the plurality of SSBs. Alternatively, the adjustment unit 750 is configured to adjust a correspondence relationship between the at least one SSB and the at least one CG resource.

Figure 8:
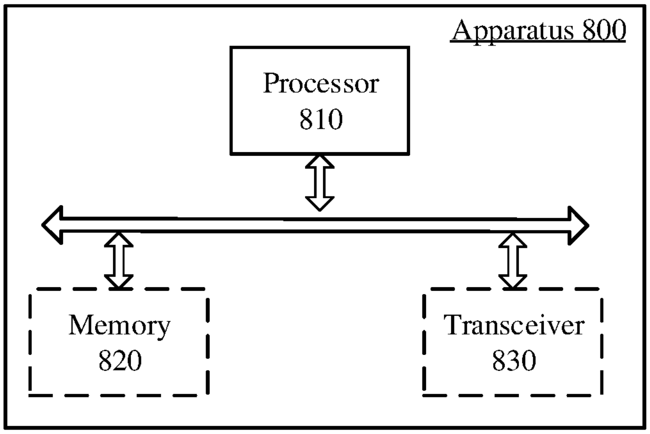
FIG. 8 is a schematic structural diagram of an apparatus according to an embodiment of the disclosure.

FIG. 8 is a schematic structural diagram of an apparatus according to an embodiment of the disclosure. Dotted lines in FIG. 8 indicate that a unit or a module is optional. The apparatus 800 may be configured to implement the method described in the above method embodiments. The apparatus 800 may be a chip or a communication apparatus.

The apparatus 800 may include one or more processors 810. The processor 810 may support the apparatus 800 to implement the method described in the above method embodiments. The processor 810 may be a general processor or a dedicated processor. For example, the processor may be a Central Processing Unit (CPU). Alternatively, the processor may also be another general processor, a Digital Signal Processor (DSP), an Application Specific Integrated Circuit (ASIC), a Field-Programmable Gate Array (FPGA) or other programmable logic devices, discrete gate or transistor logic devices, and discrete hardware components. The general processors may be microprocessors or the processor may also be any conventional processors.

The apparatus 800 may include one or more memories 820. The memory 820 stores a program. The program may be executed by the processor 810, so as to enable the processor 810 to implement the method described in the above method embodiments. The memory 820 may be independent of the processor 810, and may also be integrated into the processor 810.

The apparatus 800 may further include a transceiver 830. The processor 810 may communicate with other devices or chips through the transceiver 830. For example, the processor 810 may perform data transmission and receiving between the apparatus 800 and other devices or chips through the transceiver 830.

An embodiment of the disclosure further provides a computer-readable storage medium, which is configured to store a program. The computer-readable storage medium is applicable to the communication apparatus provided in the embodiments of the disclosure; and the program enables a computer to execute the method in the embodiments of the disclosure that is executed by the communication apparatus.

An embodiment of the disclosure further provides a computer program product. The computer program product includes a program. The computer program product is applicable to the communication apparatus provided in the embodiments of the disclosure; and the program enables a computer to execute the method in the embodiments of the disclosure that is executed by the communication apparatus.

An embodiment of the disclosure further provides a computer program. The computer program is applicable to the communication apparatus provided in the embodiments of the disclosure; and the computer program enables a computer to execute the method in the embodiments of the disclosure that is executed by the communication apparatus.

It is to be understood that, in the embodiments of the disclosure, "B corresponding to A" indicates that B is associated with A, and B may be determined according to A. However, it is to further be understood that, determining B according to A does not mean that B is merely determined according to A, B may also be determined according to A and/or other information.

It is to be understood that, the term "and/or" in the disclosure is merely an association relationship describing related objects, which means that there may be three relationships, for example, A and/or B may indicate three cases: A exists alone, A and B exist simultaneously, and B exists alone. In addition, the character "/" in this paper generally indicates that the related objects are in an "or" relationship. The term "a/an" and "the" in a singular form in the present disclosure and the appended claims are also intended to include a plural form, unless other meanings are clearly denoted throughout the present disclosure.

It is to be understood that, in various embodiments of this disclosure, the sequence number of each process does not mean the order of implementation. The execution sequence of each process should be determined by its functions and internal logic, which should not constitute any limitation on the implementation process of the embodiments of this disclosure.

In several embodiments provided by this disclosure, it is to be understood that the disclosed system, apparatus, and method may be implemented in other ways. For example, the device embodiment described above is only schematic, and for example, division of the units is only logic function division, and other division manners may be adopted during practical implementation. For another example, a plurality of units or components may be combined or integrated into another system, or some characteristics may be neglected or not executed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated. The components displayed as units may or may not be physical units, that is, the components may be in one place, or may be distributed on the plurality of network units. Part or all the units may be selected according to actual requirements to achieve the purposes of the solutions of this embodiment.

In addition, the functional units in the various embodiments of the disclosure may be integrated into one processing unit, or each unit may exist alone physically, or two or more than two units may be integrated into one unit.

In the above embodiments, it may be implemented in whole or in part by software, hardware, firmware, or any combination thereof. When the software is used for implementation, it may be implemented in whole or in part in the form of the computer program product. The computer program product includes one or more computer instructions. When the above computer program instruction is loaded and executed on a computer, the above processes or functions according to the embodiments of the disclosure are generated in whole or in part. The above computer may be a general computer, a special computer, a computer network, or other programmable apparatus. The above computer instruction may be stored in the computer-readable storage medium or transmitted from one computer-readable storage medium to another computer-readable storage medium. For example, the above computer instruction may be transmitted from a website site, a computer, a server, or a data center to another website site, another computer, another server, or another data center via wire (for example, a coaxial cable, an optical fiber, a Digital Subscriber Line (DSL)) or wireless (for example, infrared, wireless, microwave, or the like). The computer-readable storage medium may be any available medium that can be read by a computer, or a data storage device, such as a server and a data center, that includes one or more available mediums integrated. The above available medium may be a magnetic medium (for example, a floppy disk, a hard disk, and a magnetic tape), an optical medium (for example, Digital Video Disc (DVD)), or a semiconductor medium (for example, Solid State Disk (SSD)), and the like.

The above is only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the protection scope of the disclosure shall be subject to the protection scope of the claims.

The invention claimed is:

1. A communication method, comprising:

performing, by a terminal device, first Small Data Transmission (SDT) on a Configured Grant (CG) resource corresponding to a first Synchronization Signal Black (SSB), wherein the terminal device is in an inactive state;

determining, by a terminal device, a first resource in a condition where Timing Advance (TA) corresponding to the terminal device is valid, Reference Signal Receiving Power (RSRP) of the first SSB meets a preset threshold and there is the CG resource corresponding to the first SSB; or, determining the first resource in a condition where the TA corresponding to the terminal device is valid, the first SSB does not meet the preset threshold, RSRP of a second SSB meets the preset threshold and there is a CG resource corresponding to the second SSB, wherein the first SSB is one of a plurality of SSBs, and the second SSB is an SSB in the plurality of SSBs other than the first SSB; and performing, by a terminal device, second SDT on the first resource.

2. The communication method of claim 1, wherein the first resource is the CG resource corresponding to the first SSB; and the TA corresponding to the terminal device is valid and the RSRP of the first SSB meets the preset threshold.

3. The communication method of claim 1, wherein the first resource is the CG resource corresponding to the second SSB; and the TA corresponding to the terminal device is valid, the RSRP of the first SSB does not meet the preset threshold, and the RSRP of the second SSB meets the preset threshold.

4. The communication method of claim 1, wherein when neither of the conditions is met, the method further comprises:

initiating a contention-based random access process, and in the random access process, sending, by the terminal device, identity identifier information of the terminal device through a message Msg3 or a message MsgA; and monitoring, by the terminal device, dynamic scheduling of a network device to determine the first resource.

5. The communication method of claim 4, further comprising:

releasing or suspending, by the terminal device, at least one CG resource corresponding to at least one of the plurality of SSBs.

6. The communication method of claim 5, wherein releasing or suspending, by the terminal device, the at least one CG resource corresponding to at least one of the plurality of SSBs comprises:

releasing or suspending, by the terminal device, the at least one CG resource corresponding to the at least one SSB when at least one of followings is met:

a contention collision resolution message being received from the network device;

after the contention collision resolution message is received, indication information configured to release or suspend the at least one CG resource corresponding to the at least one SSB being received from the network device; or none of the conditions being met.

7. The communication method of claim 1, wherein at least one CG resource corresponding to at least one of the plurality of SSBs is configured by a network device.

8. The communication method of claim 1, further comprising:

sending, by the terminal device, third information for indicating a fourth SSB when the plurality of SSBs comprise the fourth SSB that meets at least one of followings:

RSRP of the fourth SSB meeting the preset threshold, and there being no CG resource corresponding to the fourth SSB;

the fourth SSB being an SSB with the best signal quality among the plurality of SSBs, and there being no CG resource corresponding to the fourth SSB; or the fourth SSB being the only SSB with RSRP meeting the preset threshold among the plurality of SSBs, and there being a CG resource corresponding to the fourth SSB.

9. A terminal device, comprising: a memory and a processor, wherein the memory is configured to store a program, and the processor is configured to call the program stored in the memory to cause the terminal device to:

perform first Small Data Transmission (SDT) on a Configured Grant (CG) resource corresponding to a first Synchronization Signal Black (SSB), wherein the terminal device is in an inactive state;

determine a first resource according to a second condition in a condition where Timing Advance (TA) corresponding to the terminal device is valid, Reference Signal Receiving Power (RSRP) of the first SSB meets a preset threshold and there is a CG resource corresponding to the first SSB; or, determine the first resource in a condition where the TA corresponding to the terminal device is valid, the first SSB does not meet the preset threshold, RSRP of a second SSB meets the preset threshold and there is a CG resource corresponding to the second SSB, wherein the first SSB is one of a plurality of SSBs, and the second SSB is an SSB in the plurality of SSBs other than the first SSB; and perform second SDT on the first resource.

10. The terminal device of claim 9, wherein the first resource is the CG resource corresponding to the first SSB; and the TA corresponding to the terminal device is valid and the RSRP of the first SSB meets the preset threshold; or the first resource is the CG resource corresponding to the second SSB; and the TA corresponding to the terminal device is valid, the RSRP of the first SSB does not meet the preset threshold, and the RSRP of the second SSB meets the preset threshold.

11. The terminal device of claim 9, wherein when neither of the conditions is met, the processor is further configured to call the program stored in the memory to cause the terminal device to:

initiate a contention-based random access process, and in the random access process, send identity identifier information of the terminal device through a message Msg3 or a message MsgA; and monitor dynamic scheduling of a network device to determine the first resource.

12. The terminal device of claim 11, wherein the processor is further configured to call the program stored in the memory to cause the terminal device to:

release or suspend at least one CG resource corresponding to at least one of the plurality of SSBs.

13. The terminal device of claim 12, wherein the processor is further configured to call the program stored in the memory to cause the terminal device to release or suspend the at least one CG resource corresponding to the at least one SSB when at least one of followings is met:

a contention collision resolution message being received from the network device;

after the contention collision resolution message is received, indication information configured to release or suspend the at least one CG resource corresponding to the at least one SSB being received from the network device; or none of the conditions being met.

14. The terminal device of claim 9, wherein at least one CG resource corresponding to at least one of the plurality of SSBs is configured by the network device.

15. A network device, comprising: a memory and a processor, wherein the memory is configured to store a program, and the processor is configured to call the program stored in the memory to cause the network device to:

receive first Small Data Transmission (SDT) on a Configured Grant (CG) resource corresponding to a first Synchronization Signal Black (SSB) from a terminal device which is in an inactive state; and receive second SDT on a first resource from the terminal device, wherein the first resource is determined in a condition where Timing Advance (TA) corresponding to the terminal device is valid, Reference Signal Receiving Power (RSRP) of the first SSB meets a preset threshold and there is a CG resource corresponding to the first SSB; or, the first resource is determined in a condition where the TA corresponding to the terminal device is valid, the first SSB does not meet the preset threshold, the RSRP of the second SSB meets the preset threshold and there is a CG resource corresponding to the second SSB, wherein the first SSB is one of a plurality of SSBs, and the second SSB is an SSB in the plurality of SSBs other than the first SSB.

16. The network device of claim 15, wherein the first resource is the CG resource corresponding to the first SSB; and the TA corresponding to the terminal device is valid and the RSRP of the first SSB meets the preset threshold; or the first resource is the CG resource corresponding to the second SSB; and the TA corresponding to the terminal device is valid, the RSRP of the first SSB does not meet the preset threshold, and the RSRP of the second SSB meets the preset threshold.

17. The network device of claim 15, wherein when neither of the conditions is met, the processor is configured to call the program stored in the memory to cause the network device to:

receive a contention-based random access process initiated by the terminal device, and in the random access process, to receive identity identifier information of the terminal device that is sent by the terminal device through a message Msg3 or a message MsgA; and dynamically schedule the first resource for the terminal device.

18. The network device of claim 17, wherein at least one CG resource corresponding to at least one of the plurality of SSBs is a CG resource released or suspended by the terminal device.

19. The network device of claim 18, wherein the at least one CG resource corresponding to the at least one SSB is the CG resource which is released or suspended by the terminal device when at least one of followings is met:

a contention collision resolution message being received from the network device;

after the contention collision resolution message is received, indication information configured to release or suspend the at least one CG resource corresponding to the at least one SSB being received from the network device; or none of the conditions being met.

20. The network device of claim 15, wherein at least one CG resource corresponding to at least one of the plurality of SSBs is configured by the network device.

* * * * *